(12) United States Patent
Oveis Gharan et al.

(10) Patent No.: US 10,484,131 B2
(45) Date of Patent: Nov. 19, 2019

(54) COMMUNICATIONS WITH CONDITIONAL CHAIN DECODING

(71) Applicants: Shahab Oveis Gharan, Ottawa (CA); Mohammad Ehsan Seifi, Ottawa (CA); Masoud Ebrahimi Tazeh Mahalleh, Ottawa (CA); Kim B. Roberts, Ottawa (CA)

(72) Inventors: Shahab Oveis Gharan, Ottawa (CA); Mohammad Ehsan Seifi, Ottawa (CA); Masoud Ebrahimi Tazeh Mahalleh, Ottawa (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 15/841,988

(22) Filed: Dec. 14, 2017

(65) Prior Publication Data

US 2019/0190651 A1    Jun. 20, 2019

(51) Int. Cl.
  *H04L 1/00* (2006.01)
  *H04L 27/36* (2006.01)
  *H04L 27/00* (2006.01)

(52) U.S. Cl.
  CPC .......... *H04L 1/0042* (2013.01); *H04L 1/0048* (2013.01); *H04L 1/0057* (2013.01); *H04L 27/362* (2013.01); *H04L 2027/0057* (2013.01)

(58) Field of Classification Search
  CPC .................................................. H04L 1/0042
  See application file for complete search history.

(56) References Cited

U.S. PATENT DOCUMENTS

| 9,088,387 B2 | 7/2015 | Oveis Gharan et al. |
| 9,537,608 B2 | 1/2017 | Oveis Gharan et al. |
| 9,698,939 B2 | 7/2017 | Oveis Gharan et al. |
| 2014/0270000 A1* | 9/2014 | Liu .................. H04L 1/0047 375/320 |

(Continued)

OTHER PUBLICATIONS

Pending U.S. Appl. No. 15/672,434, filed Aug. 9, 2017.

(Continued)

*Primary Examiner* — Kevin M Cunningham
(74) *Attorney, Agent, or Firm* — Integral Intellectual Property Inc.; Amy Scouten; Miriam Paton

(57) ABSTRACT

Client data bits, including first client data bits and second client data bits, are communicated from a transmitter to a receiver. At the transmitter, the first client data bits are processed to generate processed values, where each processed value is more likely to be a first element than a second element. Forward Error Correction 'FEC' encoding is applied to the second client data bits to generate FEC-encoded values. Symbols are created by mapping the FEC-encoded values to first positions in the symbols and by mapping the processed values to second positions in the symbols. The symbols are modulated onto a communications channel using a modulation scheme with a code that assigns a lower average energy to symbols containing the first elements in the second positions than to symbols containing the second elements in the second positions. At the receiver, client data bits are decoded using conditional chain decoding.

24 Claims, 9 Drawing Sheets

(56) References Cited

U.S. PATENT DOCUMENTS

| | | | | |
|---|---|---|---|---|
| 2014/0369680 | A1* | 12/2014 | Oveis Gharan | H04L 1/0042 398/27 |
| 2015/0033092 | A1* | 1/2015 | Oveis Gharan | H03M 13/251 714/752 |
| 2016/0211943 | A1* | 7/2016 | Jung | H04L 1/0054 |
| 2017/0126354 | A1* | 5/2017 | Marsland | H04L 1/0041 |
| 2018/0063849 | A1* | 3/2018 | Mohammed | H04L 1/0047 |
| 2018/0097557 | A1* | 4/2018 | Taylor, Jr. | H04N 19/13 |

OTHER PUBLICATIONS

Pending U.S. Appl. No. 15/703,180, filed Sep. 13, 2017.

Caire, et al., "Bit-Interleaved Coded Modulation", IEEE Transactions on Information Theory, vol. 44, No. 3, May 3, 1998.

Imai, et al., "A New Multilevel Coding Method Using Error-Correcting Codes", IEEE Transactions on Information Theory, vol. IT-23, No. 3, pp. 371-377, May 1977., 1977.

Kasturia, et al., "Techniques for High-Speed Implementation of Nonlinear Cancellation", IEEE Journal on Selected Areas in Communications, vol. 9, No. 5, pp. 711-717, Jun. 1991., 1991.

Li, et al., "Bit-Interleaved Coded Modulation with Iterative Decoding," IEEE Communications Letters, vol. 1, No. 6, Nov. 1997., 1997.

Li, et al., "Bit-Interleaved Coded Modulation with Iterative Decoding and 8PSK Signaling", IEEE Transactions on Communications, vol. 50, No. 8, Aug. 2002., 2002.

Ten Brink, et al., "Iterative demapping and decoding for multilevel modulation", Proc. IEEE Globecom Conf., pp. 579-584, 1998., 1998.

Ten Brink, et al., "Iterative demapping for QPSK modulation", Electronic Letters, vol. 34, No. 15, pp. 1459-1460, Jul. 1998, 1998.

Ungerboeck, "Channel Coding with Multilevel/Phase Signals", IEEE Transactions on Information Theory, vol. IT-28, No. 1, pp. 55-67, Jan. 1982., 1982.

Wachsmann, et al., "Multilevel Codes: Theoretical Concepts and Practical Design Rules", IEEE Transactions on Information Theory, vol. 45, No. 5, pp. 1361-1391, Jul. 5, 1999., 1999.

\* cited by examiner

COMMUNICATIONS WITH CONDITIONAL CHAIN DECODING

TECHNICAL FIELD

This document relates to the technical field of communications.

BACKGROUND

In communications, a transmitter uses a particular modulation scheme to map bits of data to symbols, and then modulates one or more carriers with the symbols to produce a signal that is transmitted over a communications channel to a receiver. The receiver device applies an inverse process of demodulation to the received signal to produce estimates of the symbols, the data bits, or both. During its transmission over the channel, the signal may experience noise and/or distortion. Noise and/or distortion may also be contributed to the signal by components of the transmitter and/or receiver. The noise and/or distortion experienced by the signal may lead to errors in the symbols or bits recovered at the receiver.

The reliability of a communications channel may be characterized by the Bit Error Ratio or Bit Error Rate (BER), which measures the ratio of the expected number of erroneously received bits (or symbols) to the total number of bits (or symbols) that are transmitted over the communications channel. A given application may have a maximum BER tolerance. For example, an application may require that the BER not exceed $10^{-16}$.

Forward Error Correction (FEC) techniques may be used to reduce the BER. FEC encoding performed at a transmitter maps input information bits to FEC-encoded bits, which include redundant information, such as parity or check bits. FEC decoding subsequently performed at a receiver uses the redundant information to detect and correct bit errors. When a systematic FEC code is employed, the FEC-encoded bits output from the FEC encoder consist of redundant bits and the information bits that were input to the FEC encoder.

FEC encoding is advantageous in that it may permit error control without the need to resend data packets. However, this is at the cost of increased overhead. The amount of overhead or redundancy added by a FEC encoder may be characterized by the information rate R, where R is defined as the ratio of the amount of input information to the amount of data that is output after FEC encoding (which includes the overhead). For example, if FEC encoding adds 25% overhead, then for every four information bits that are to be FEC-encoded, the FEC encoding will add 1 bit of overhead, resulting in 5 FEC-encoded data bits to be transmitted to the receiver. This corresponds to an information rate R=4/5=0.8.

A variety of techniques for FEC encoding and FEC decoding are known. Throughout this document, FEC decoding may be understood to "correspond" to FEC encoding in the event that the FEC decoding and FEC encoding employ an identical FEC code. The combination of a FEC encoding process and the corresponding FEC decoding process may be referred to as a "FEC scheme." Stronger FEC schemes provide better protection (i.e., better error detection and correction) by adding more redundancy. However, this is at the expense of a lower information rate. Circuitry to implement stronger FEC schemes may also take up more space, may be more costly, and may produce more heat than circuitry to implement weaker (i.e., higher-rate) FEC schemes.

A FEC scheme may be selected to satisfy a desired BER tolerance. It is of interest to maximize the information rate, while satisfying the desired BER tolerance.

Decoding schemes that require more feedback and/or memory may be more challenging to implement, may lead to larger-sized hardware, and may produce more heat.

SUMMARY

According to a broad aspect, a method is performed at a transmitter for communicating client data bits, including first client data bits and second client data bits, over a communications channel to a receiver. The method may comprise processing the first client data bits to generate processed values, where each first client data bit has a substantially equal probability of being zero and being one, and where each processed value has a substantially higher probability of being one or more first elements than of being one or more second elements; applying first forward error correction 'FEC' encoding to the processed values to generate first FEC-encoded values consisting of FEC-encoded processed values and redundant values; applying second FEC encoding to at least the second client data bits to generate second FEC-encoded values; creating symbols by mapping the second FEC-encoded values to one or more first positions in the symbols and by mapping the FEC-encoded processed values to one or more second positions in the symbols; and modulating the symbols onto the communications channel using a modulation scheme with a code that assigns a lower average energy to symbols containing the one or more first elements in the one or more second positions than to symbols containing the one or more second elements in the one or more second positions.

According to another broad aspect, a method is performed at a receiver for decoding client data bits, including first client data bits and second client data bits, from a signal received over a communications channel from a transmitter. The method may comprise determining estimates of transmitted symbols from the signal received over the communications channel based on a modulation scheme implemented at the transmitter; determining, from the estimates of the transmitted symbols, first value estimates for one or more first positions in the transmitted symbols based on a code implemented at the transmitter; determining, from the estimates of the transmitted symbols, two or more conditional second value estimates for one or more second positions in the transmitted symbols, where each conditional second value estimate corresponds to a different value or combination of values in the one or more first position; applying second forward error correction 'FEC' decoding to the first value estimates to generate corrected first values, where the corrected first values consist of the second client data bits and redundant values; using the corrected first values to select second value estimates from the conditional second value estimates; applying first FEC decoding to at least the selected second value estimates to generate corrected second values, where each corrected second value has a substantially higher probability of being one or more first elements than of being one or more second elements; and processing the corrected second values to generate the first client data bits, where each first client data bit has a substantially equal probability of being zero and being one.

DETAILED DESCRIPTION

Figure 1:
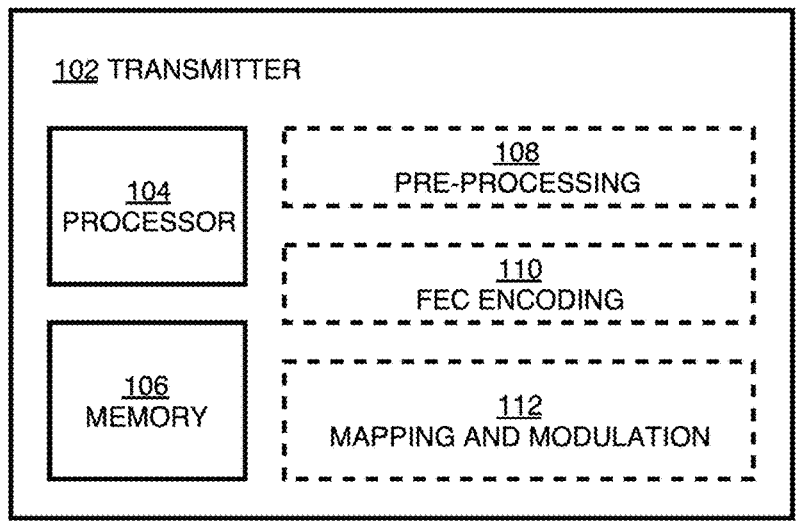
FIG. 1 illustrates an example communications system in accordance with the technology disclosed herein.
Figure 1:
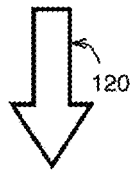
Figure 1:
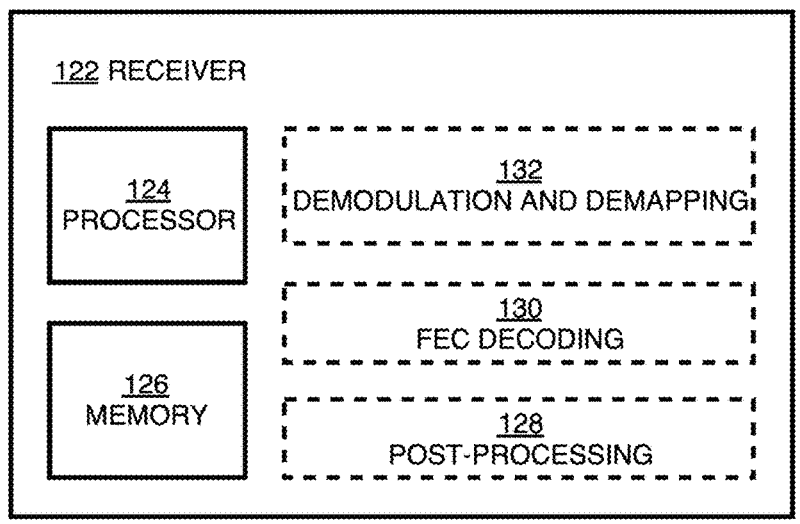

Techniques for multilevel coding and multistage decoding are described in Imai et al., "A new multilevel coding method using error correcting codes," IEEE *Transactions on Information Theory*, Vol. IT-23, No. 3, pp. 371-377, May 1977, and also in Wachsmann et al. "Multilevel Codes: Theoretical Concepts and Practical Design Rules," *IEEE Transactions on Information Theory*, Vol. 45, No. 5, pp. 1361-1391, July 1999.

Techniques for conditional decoding are described in Ungerboeck, "Channel coding with multilevel/phase signals," *IEEE Transactions on Information Theory*, Vol. IT-28, No. 1, pp. 55-67, January 1982, and also in Kasturia et al., "Techniques for High-speed Implementation of Nonlinear Cancellation," *IEEE Journal on Selected Areas in Communications*, Vol. 9, No. 5, pp. 711-717, June 1991.

Techniques for iterative decoding are described in Brink et al., "Iterative demapping and decoding for multilevel modulation," *Proceedings of IEEE Globecom Conference*, pp. 579-584, 1998; in Brink et al. "Iterative demapping for QPSK modulation," *Electronic Letters*, Vol. 34, No. 15, pp. 1459-1460, July 1998; in Li et al., "Bit-Interleaved Coded Modulation with Iterative Decoding," *IEEE Communications Letters*, Vol. 1, No. 6, November 1997; in Caire et al., "Bit-interleaved Coded Modulation," *IEEE Transactions on Information Theory*, Vol. 44, pp. 927-946, May 1998; and in Li et al., "Bit-Interleaved Coded Modulation with Iterative Decoding and 8PSK Signaling," *IEEE Transactions on Communications*, Vol. 50, No. 8, pp. 1250-1257, 2002.

U.S. Pat. No. 9,088,387 to Oveis Gharan et al. describes techniques for chain encoding and decoding of high speed signals. A multi-bit estimate of the symbol is subdivided into a first part and a second part, each part including at least one respective bit of the estimate. A most likely value of the first part is detected. The most likely value of the first part is processed using a FEC decoder to generate a corrected first part value, which is used to detect a most likely value of the second part. The most likely value of the second part is then processed by the FEC decoder to generate a corrected second part, which is combined with the corrected first part to recover the value of the symbol.

U.S. Pat. No. 9,537,608 to Oveis Gharan et al. describes a FEC technique referred to as staggered parity, in which parity vectors are computed such that each parity vector spans a set of frames; a subset of bits of each frame is associated with parity bits in each parity vector; and a location of parity bits associated with one frame in one parity vector is different from that of parity bits associated with the frame in another parity vector.

U.S. Pat. No. 9,698,939 to Oveis Gharan et al. describes variable spectral efficiency optical modulation schemes in which an encoder processes an N-bit input vector D in accordance with a reversible mapping to generate a corresponding M-bit output vector S, where M N. In some examples, bits of the input vector D may have a substantially equal probability of being a binary "0" and a binary "1", whereas bits of the output vector S may be made to have a substantially higher probability of being a binary "0" than being a binary "1". In one specific example, the bits of the output vector S might have an 83% probability of being zero and a 17% probability of being one. In one example, the N/M mapping encoder may be implemented as a tree code. In another example, the N/M mapping encoder may be implemented algebraically.

U.S. patent application Ser. No. 15/672,434 to Oveis Gharan et al., filed on Aug. 9, 2017 and incorporated herein by reference, describes techniques for FEC with contrast coding. Contrast coding may be used to tune the BERs experienced by different subsets of bits, relative to each other, to better match a plurality of FEC schemes. For example, contrast coding may be used to increase the BER of a first subset of bits relative to the BER of a second subset of bits. A strong FEC scheme (with a large amount of redundancy) may be applied to the first subset, and a high-rate FEC scheme (with a small amount of redundancy) may be applied to the second subset.

FIG. 1 illustrates an example communications system 100 in accordance with the technology disclosed herein. The communications system 100 comprises a transmitter 102 and a receiver 122, the transmitter 102 being configured to transmit a signal 120 to the receiver 122 over one or more communications channels, where the signal 120 is representative of client data bits to be communicated from the transmitter 102 to the receiver 122. The signal 120 may be transmitted optically, for example using optical fibers, or using other means of wired or wireless communications, with one or more carriers or baseband.

Each of the transmitter 102 and the receiver 122 may be embodied by one or more electronic devices. Each of the transmitter 102 and the receiver 122 may comprise a respective processor and a respective memory, where the memory may be, for example, in the form of a non-transitory computer-readable medium. The transmitter 102 may comprise a processor 104 and a memory 106, where the processor 104 is configurable to execute computer-executable instructions stored in the memory 106. The receiver 122 may comprise a processor 124 and a memory 126, where the processor 124 is configurable to execute computer-executable instructions stored in the memory 126. The computer-executable instructions stored in the memory 106 of the transmitter 102 may comprise instructions for performing various methods described herein, including for example, the method 600 illustrated in FIG. 6. The computer-executable instructions stored in the memory 126 of the receiver 122 may comprise instructions for performing various methods described herein, including for example, the method 700 illustrated in FIG. 7.

FIG. 1 is merely a schematic illustration. It should be understood that each of the transmitter 102 and the receiver 122 may comprise additional hardware and/or software components that are not shown in FIG. 1. In one example, the boxes illustrated in dashed lines may be understood to represent processes that are implemented by the processors 104 and 124, respectively, upon execution of computer-executable instruction stored in the respective memories 106 and 126. In another example, the boxes illustrated in dashed lines may be understood to represent processes that are implemented solely in hardware of the transmitter 102 and the receiver 122, respectively. In yet another example, the boxes illustrated in dashed lines may be understood to represent processes that are implemented using some combination of hardware and computer-executable software and/or firmware.

According to some examples of the technology disclosed herein, some client data bits may undergo pre-processing 108 at the transmitter 102 to generate processed values. The processed values may comprise bits, elements of an alphabet, or other indicators. Post-processing 128, which is the inverse of the pre-processing 108, may be applied at the receiver 122 in order to recover bits that are representative of the original client data bits. One example of the pre-processing 108 may comprise encoding using a tree code as described by Oveis Gharan et al. in U.S. Pat. No. 9,698,939. In this case, the post-processing 128 would comprise decoding based on the same tree code used for the pre-processing 108.

According to some examples of the technology disclosed herein, some values may undergo FEC encoding 110 at the transmitter 102 to generate FEC-encoded values. Corresponding FEC decoding 130 may be applied at the receiver 122. The FEC encoding 110 and FEC decoding 130 may correspond to a plurality of FEC schemes, where each scheme is applied to different sets or classes of values. As will be described later, with respect to specific examples, the FEC encoding 110 may be applied to raw client data bits, to processed values, or to previously-FEC-encoded values.

According to examples of the technology disclosed herein, values to be transmitted from the transmitter 102 to the receiver 122 may be combined into multi-bit symbols, where specific values are mapped to specific positions within the symbols. The symbols are then modulated onto one or more communications channels using a specific modulation scheme with a specific code, as denoted by mapping and modulation 112. As will be described later, with respect to specific examples, the mapping and modulation 112 may be performed using a modulation scheme represented by a rectangular constellation with a non-Gray code, for example. A Gray code is a mapping scheme in which binary sequences assigned to adjacent signal points (signal points with minimum Euclidean distance) within a constellation differ by only a single bit. In contrast, a non-Gray code may be defined as a mapping scheme in which the binary sequence assigned to two adjacent signal points within a constellation may differ by more than one bit. At the receiver 122, the signal 120 undergoes demodulation and demapping 132 in order to recover estimates of the transmitted symbols, or estimates of the corresponding values or bits, or estimates of both. The demodulation and demapping 132 is performed based on the modulation scheme and the code that was used for the mapping and modulation 112. A bit estimate may comprise a binary value, or may comprise a confidence value, such as log-likelihood ratio. In the case of a binary value (i.e., a bit), log-likelihood ratio (LLR) is defined as the logarithm of the ratio of the probability of the bit being equal to one to the probability of the bit being equal to zero. For example, for a bit "b", $$LLR(b) = \log \frac{P(b=1)}{P(b=0)},$$

where P denotes probability. For non-binary values, such as a set of integers, other metrics could be used, such as the logarithm of the probability of a given integer value divided by the sum of the probabilities of the other possible integer values, for example.

During its transmission from the transmitter 102 to the receiver 122, the signal 120 may experience noise and/or distortion, including contributions of noise and/or distortion from components of the transmitter 102 and receiver 122 themselves. The noise and/or distortion may lead to errors in the symbols recovered from the demodulation and demapping 132, as well as errors in the bits represented by the symbols.

Figure 2:
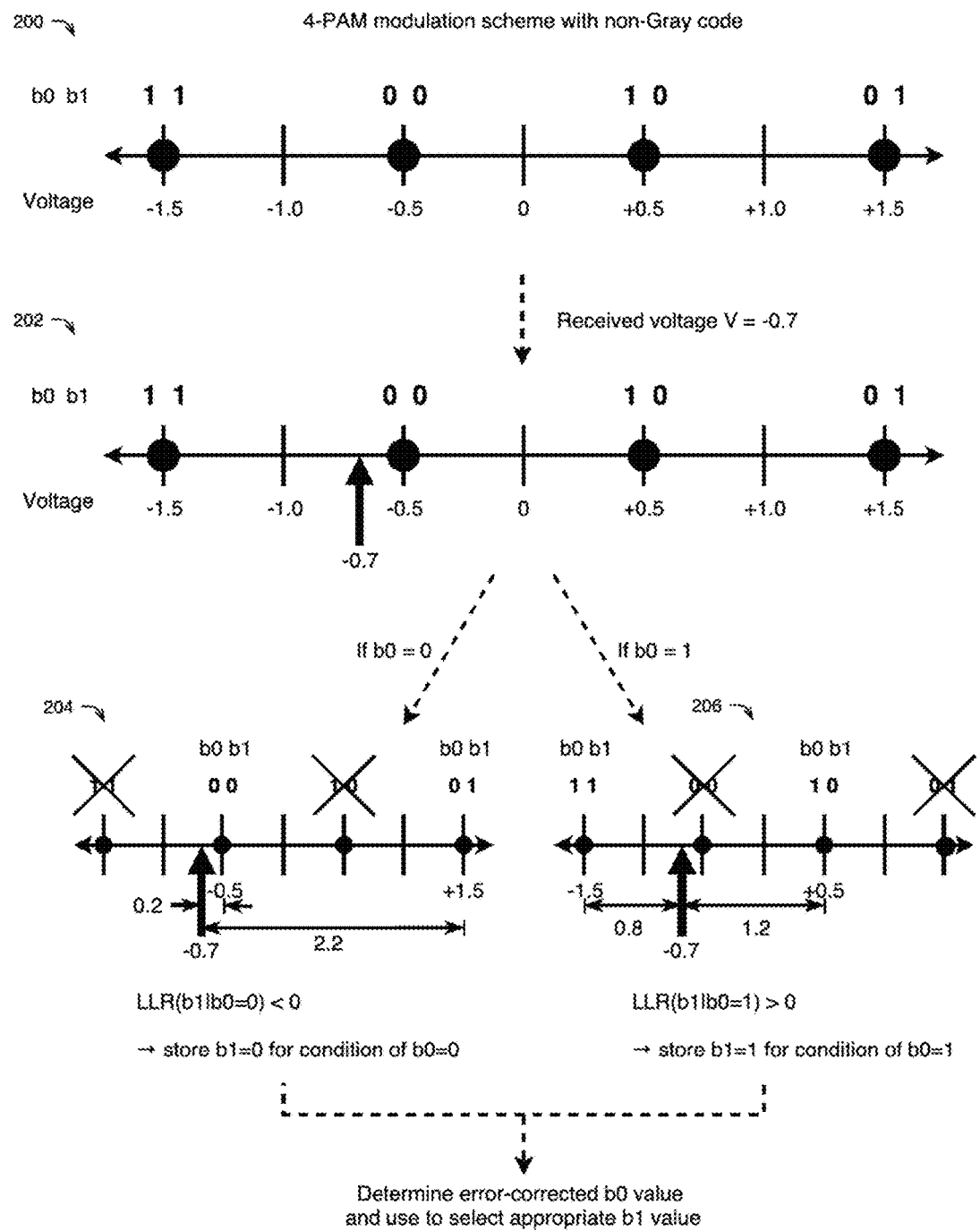
FIG. 2 illustrates a constellation diagram for a 4-level pulse-amplitude modulation (4-PAM) modulation scheme with a non-Gray code, and an example process for conditional chain decoding.

FIG. 2 illustrates a constellation diagram for a 4-level pulse-amplitude modulation (4-PAM) modulation scheme with a non-Gray code, and an example process for conditional chain decoding.

According to the 4-PAM modulation scheme, four distinct pulse amplitudes (e.g., voltages) are used to convey four distinct symbols, where each symbol represents two bits, one at bit position b0 and the other at bit position b1. Thus, the four distinct symbols are: "00", "01", "10", and "11." As shown in the constellation diagram at 200, a non-Gray code assigns the bits at positions b0 and b1 to the four distinct symbols, and each of the four distinct symbols is assigned a unique voltage according to Table 1.

TABLE 1

| b0 b1 | Symbol | Voltage |
| --- | --- | --- |
| 0 0 | "00" | −0.5 |
| 0 1 | "01" | +1.5 |
| 1 0 | "10" | +0.5 |
| 1 1 | "11" | −1.5 |

Due to the nature of a non-Gray code, the decoding of one bit within a symbol may be used to improve the estimate of another bit within the symbol. For example, symbols to which bits are assigned according to a non-Gray code may be decoded using chain decoding as described, for example, by Oveis Gharan et al. in U.S. Pat. No. 9,088,387. In the case of the code in Table 1, an estimate of the bit at position b0 may be determined based on a received voltage V. This estimate, which may be in the form of a log likelihood ratio LLR(b0), may then undergo error correction to determine a corrected value of the bit at position b0. This corrected b0 value, which is effectively error-free, may then be fed back into a second stage of decoding, in which it is used to provide an improved estimate of the bit b1. This estimate of the bit at position b1, which may also be in the form of a log likelihood ratio LLR(b1), may then undergo its own error correction process, thereby resulting in a corrected (error-free) value of the bit at position b1.

This traditional process of chain decoding uses feedback of the error-free value for b0 to determine the estimate LLR(b1). This feedback and the storage of LLR(b1) may require a significant amount of memory and may be challenging to implement. Hardware complexity and memory requirements may be reduced by using conditional chain decoding. In conditional chain decoding, rather than waiting to decode the bit at position b1 until after the bit at position b0 has already been decoded, two conditional values of the bit at position b1 may be pre-emptively determined and temporarily stored, corresponding to the two possible values of the bit at position b0. The conditional values of the b1 bit may comprise only single bits, which require less memory to store than LLR(b1), which is stored in traditional chain decoding. Once the corrected value of the b0 bit is determined, the corresponding value of the b1 bit may be selected from the two stored conditional values, and the other stored conditional value may be removed from memory.

This technique of conditional chain decoding is shown at 204 and 206, for the example in which the received voltage is V=−0.7. As shown at 204, there are two possible symbols that satisfy the condition that b0=0: "00" and "01". Using the respective voltages of the two possible symbols, and the received voltage V, it is possible to calculate the log likelihood ratio for the b1 bit under the condition that b0=0, that is, LLR(b1|b0=0). For this particular example, assuming that the transmitted signal has been corrupted with additive white Gaussian noise with variance $\sigma^2$ per real dimension, the log likelihood ratio for the b1 bit under the condition b0=0 may be defined as:

$$LLR(b1 \mid b0 = 0) = \log \frac{P(b1 = 1 \mid y, b0 = 0)}{P(b1 = 0 \mid y, b0 = 0)} \quad [1]$$

where P(b1=1|y, b0=0) is the probability of b1=1 conditioned on a received voltage y and b0=0, and P(b1=0|y, b0=0) is the probability of b1=0 conditioned on the received voltage y and b0=0. Equation 1 may be simplified as follows:

$$LLR(b1 \mid b0 = 0) = \log \frac{f(y \mid b1b0 = 10)P(b1 = 1)}{f(y \mid b1b0 = 00)P(b1 = 0)} \quad [2]$$

where f(y|b1b0=10) is the probability distribution of the received voltage conditioned on the transmitted symbol being b1b0=10, and where f(y|b1b0=00) is the probability distribution of the received voltage conditioned on the transmitted symbol being b1b0=00. Using the additive white Gaussian noise assumption, the LLR calculation in Equation 2 may be further simplified as follows:

$$LLR(b1 \mid b0 = 0) = \log \frac{\exp(-(y-1.5)^2/2\sigma^2)p1}{\exp(-(y+0.5)^2/2\sigma^2)p0} = \frac{2y-1}{\sigma^2} + \log \frac{p1}{p0} \quad [3]$$

where p0 and p1 denote the respective probabilities of transmitting symbols having b1=0 and b1=1 and satisfy p0+p1=1.

For a received voltage y that has the value V=−0.7, as illustrated in FIG. 2, assuming b1=0 and b1=1 are equally likely (i.e. p0=p1=0.5), Equation 3 results in a value for LLR(b1|b0=0) that is lower than zero. Thus, for the condition that b0=0, the probability that b1=0 is higher than the probability that b1=1. This difference in probability is a result of the labeling scheme, which provides a large separation between the voltages for symbols "00" and "01" (i.e., −0.5 and +1.5, respectively).

Since there is a higher probability that b1=0 for the condition that b0=0, it may be advantageous to only store the value b1=0 for this condition, rather than storing the log likelihood ratio, which would require more memory. Accordingly, a value of b1=0 may be temporarily stored in correspondence with the condition that b0=0.

As denoted by 206, there are two possible symbols that satisfy the condition that b0=1: "11" and "10". Using the respective voltages of the two possible symbols, and the received voltage V, it is possible to calculate the log likelihood ratio for the b1 bit under the condition that b0=1, that is, LLR(b1|b0=1). In a similar manner to the derivation of Equation 3, the log likelihood ratio for the b1 bit under the condition that b0=1 may be expressed as follows:

$$LLR(b1 \mid b0 = 1) = \frac{-2y-1}{\sigma^2} + \log \frac{p1}{p0} \quad [4]$$

For V=−0.7, assuming b1=0 and b1=1 are equally likely (i.e. p0=p1=0.5), Equation 4 results in a value for LLR(b1|b0=1) that is higher than zero. Thus, for the condition that b0=1, the probability that b1=1 is higher than the probability that b1=0. Accordingly, a value of b1=1 may be temporarily stored in correspondence with the condition that b0=1.

In this example, the two conditional values for the b1 bit differ. However, circumstances are contemplated in which the two conditional values may be the same. In such cases, a single value for b1 bit may be stored and associated with both conditions.

At any point before, during, or after determining and storing the conditional values for the b1 bit for the two different conditions of b0=0 and b0=1, the true value of the b0 bit may be determined from the received voltage V. For example, the b0 bit may be estimated in the form of a log likelihood ratio LLR(b0), and then FEC decoding may applied to the estimate to determine the corrected value of the b0 bit. Once the corrected value of the b0 bit is determined, it may then be used to select the appropriate stored value of the b1 bit from the memory. For example, if the corrected value of the b0 bit is determined to be zero, then the selected value of the b1 bit would be zero. The selected value of the b1 bit might then undergo its own FEC decoding to determine the corrected value of the b1 bit.

As an alternative to storing the b1 bit estimates corresponding to each b0 condition, an array could be stored that comprises the squared Euclidean distances, with the choices per array position being determined by the two possible values of the b0 bit. Once the corrected value of the b0 bit is determined, it may be used to select the appropriate squared Euclidean distances from the stored array, and the corresponding value of the b1 bit may be calculated.

Less memory may be needed to temporarily store the conditional values of the b1 bit (or the array of squared Euclidean distances) than what is required with traditional chain decoding, which may be advantageous for satisfying limitations associated with heat, size, and complexity.

Other functions of the voltage V and the symbol locations could be stored and used to represent the conditional estimates.

Although the above example shows conditional decoding on the basis of one bit, it is contemplated that the conditional decoding could be based on more than one bit. For example, with a 16-level quadrature amplitude modulation (16-QAM) modulation scheme with a non-Gray code, conditional chain decoding could be performed on the basis of two bits. This will be described in more detail with respect to FIGS. 3 and 7. Higher numbers of dimensions and conditioning could also be used.

An interesting property of the non-Gray code shown at 200 is that the susceptibility of a given bit to noise will depend on whether that bit is assigned to the b0 bit position or to the b1 bit position.

The energy $\varepsilon$ of a given symbol is proportional to the square of the voltage V, that is $\varepsilon \alpha V^2$. As is well known in the field of communications, for linear propagation, the lower the average energy $E(\varepsilon)$ of the symbols transmitted, while preserving the separation between symbols, the greater the relative noise tolerance.

The two symbols for which b0=0 (i.e., "00" and "01") have respective voltages of −0.5 and +1.5, whereas the two symbols for which b0=1 (i.e., "10" and "11") have respective voltages of +0.5 and −1.5. It should be apparent that the average energy of the symbols for which b0=0, that is $\varepsilon(b0=0)$, is the same as the average energy of the symbols for which b0=1, that is $\varepsilon(b0=1)$. That is, $\varepsilon(b0=0)=(-0.5)^2+(+1.5)^2=2.5$, while $\varepsilon(b0=1)=(+0.5)^2+(-1.5)^2=2.5$, and therefore $\varepsilon(b0=0)=\varepsilon(b0=1)$.

On the other hand, the two symbols for which b1=0 (i.e., "00" and "10") have respective voltages of −0.5 and +0.5, whereas the two symbols for which b1=1 (i.e., "01" and "11") have respective voltages of +1.5 and −1.5. Thus, the average energy of the symbols for which b1=0, that is $\varepsilon(b1=0)$, is less than the average energy of the symbols for which b1=1, that is $\varepsilon(b1=1)$. That is, $\varepsilon(b1=0)=(-0.5)^2+(+0.5)^2=0.5$, while $\varepsilon(b1=1)=(+1.5)^2+(-1.5)^2=4.5$, and therefore $\varepsilon(b1=0)<<\varepsilon(b1=1)$. Put differently, the b1 bit position is representative of the magnitude or amplitude of the symbol.

Pre-processing may be applied to those bits that are to be assigned to the b1 bit position. For example, as described by Oveis Gharan et al. in U.S. Pat. No. 9,698,939, a tree code may be applied to some client data bits so as to generate processed bits that have a substantially higher probability of being zero than being one. By assigning these processed bits (which are more likely to be zero than one) to the b1 bit position in the 4-PAM symbols, the result will be an increase in the number of symbols with the energy $\varepsilon(b1=0)=0.5$, and a reduction in the number of symbols with the energy $\varepsilon(b1=1)=4.5$. This lowers the average energy $E(\varepsilon)$ of the symbols transmitted, and thus allows a lower SNR to be tolerated.

It is noted that assigning the processed bits to the b0 bit position would not have this effect of average energy reduction, since there is no difference between the average energy of the symbols for which b0=0 and the average energy of the symbols for which b0=1. As noted above, $\varepsilon(b0=0)=\varepsilon(b0=1)=2.5$. Similarly, the assignment of unprocessed bits to position b1 would not create this benefit as they each have equal probability of being zero and being one.

The non-Gray code illustrated in FIG. 2 assigns a lower average energy to symbols containing a bit value of zero in the b1 bit position than to symbols containing a bit value of one in the b1 bit position. This is advantageous given that the pre-processing results in the average bit value assigned to the b1 bit position having a higher-probability of being zero than being one. This advantageous combination of processing and coding may be extended to other modulation schemes.

Figure 3:
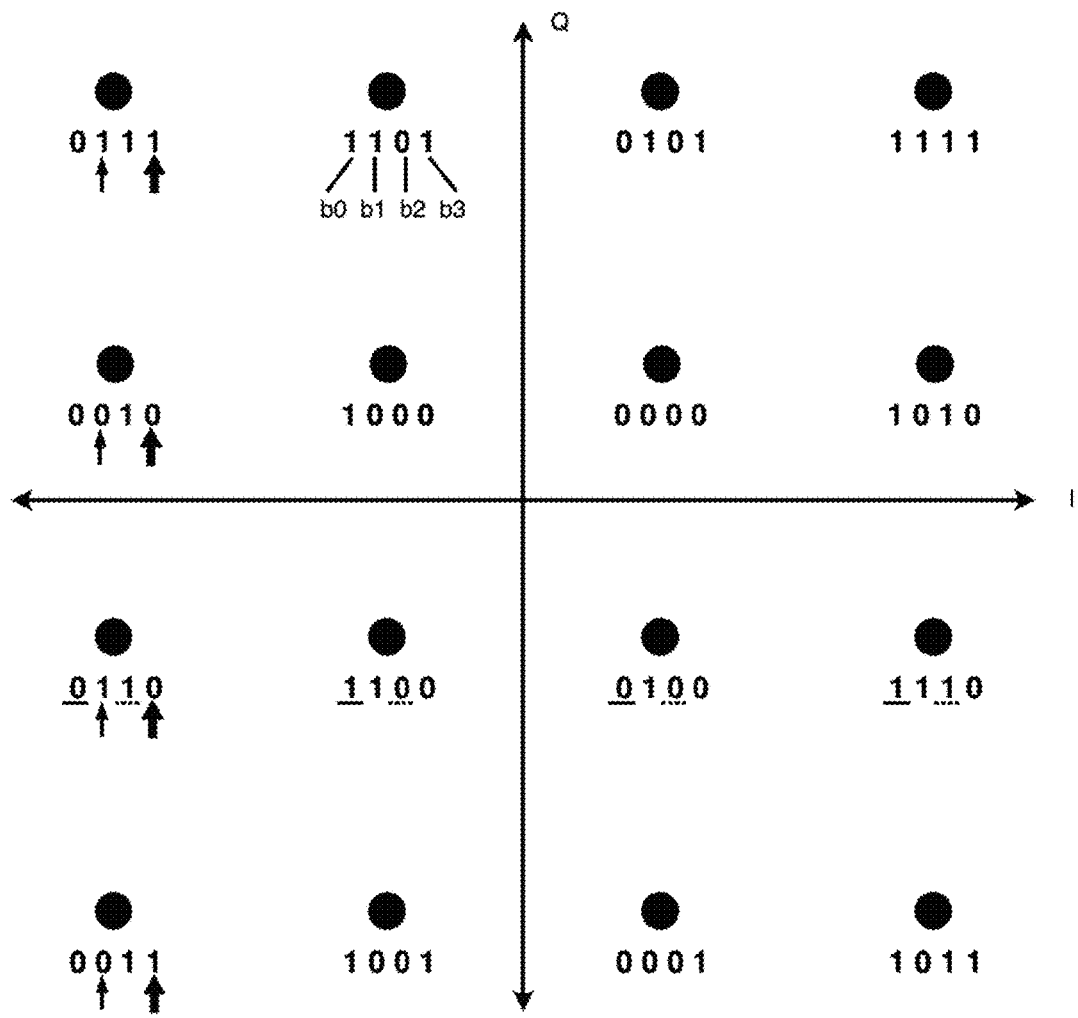
FIG. 3 illustrates a constellation diagram for a 16-level quadrature amplitude modulation (16-QAM) modulation scheme with a non-Gray code.

FIG. 3 illustrates a constellation diagram for a 16-QAM modulation scheme with a non-Gray code.

According to the 16-QAM modulation scheme, different combinations of phase and amplitude are used to convey 16 distinct symbols, where each symbol represents four bits, at respective bit positions b0, b1, b2, and b3.

Similarly to the non-Gray code shown in FIG. 2, the non-Gray code used in FIG. 3 dictates that the noise tolerance of a given bit will depend on which bit position that bit is assigned to within the symbol. In this case, it can be shown that bits assigned to the b0 and b1 bit positions will be more susceptible to noise than bits assigned to the b2 and b3 bit positions.

For example, referring to the third row down, the b0 bit is denoted by a solid underline and the b2 bit is denoted by a dotted underline. In this row, the average energy of the symbols for which b0=0 (i.e., "0110" and "0100") is the same as the average energy of the symbols for which b0=1 (i.e., "1100" and "1110"). On the other hand, the average energy of the symbols for which b2=0 (i.e., "1100" and "0100") is less than the average energy of the symbols for which b2=1 (i.e., "0110" and "1110"). Thus, a noise reduction could be achieved by pre-processing the bits that are assigned to the b2 bit position so that they have a higher probability of being zero than being one. This pre-processing would have no effect on bits assigned to the b0 bit position, since symbols with b0=0 have the same average energy as symbols with b0=1. It is clear that each row of the constellation diagram shares the properties for bit positions b0 and b2, namely that the average energy of the symbols for which b0=0 is the same as the average energy of the symbols for which b0=1, and the average energy of the symbols for which b2=0 is less than the average energy of the symbols for which b2=1.

Referring now to the first column on the left, the b1 bit is denoted by a thin arrow and the b3 bit is denoted by a thick arrow. In this column, the average energy of the symbols for which b1=0 (i.e., "0010" and "0011") is the same as the average energy of the symbols for which b1=1 (i.e., "0111" and "0110"). On the other hand, the average energy of the symbols for which b3=0 (i.e., "0010" and "0110") is less than the average energy of the symbols for which b3=1 (i.e., "0111" and "0011"). Thus, a noise reduction could be achieved by pre-processing the bits that are assigned to the b3 bit position so that they have a higher probability of being zero than being one. This pre-processing would have no effect on bits assigned to the b1 bit position, since symbols with b1=0 have the same average energy as symbols with b1=1. It is clear that each row of the constellation diagram shares the properties for bit positions b1 and b3, namely that the average energy of the symbols for which b1=0 is the same as the average energy of the symbols for which b1=1, and the average energy of the symbols for which b3=0 is less than the average energy of the symbols for which b3=1.

The modulation schemes and non-Gray codes illustrated in FIGS. 2 and 3 are merely examples that are suitable for use with the present technology. Other modulation schemes and codes may be used. For example, a natural code could be used, which is a binary mapping scheme in which the decimal values corresponding to binary sequences assigned to adjacent signal points within a constellation are in ascending order. Both uniform and non-uniform constellations may be used. Both prismatic and non-prismatic constellations may be used, where a prismatic modulation differs from a non-prismatic modulation in that it is a product of two lower-dimensional modulations. For example, in the case of two real modulations, M1 and M2, a prismatic modulation, M3=M1×M2, may be obtained as follows:

$$M3=\{x+iy|x \in M1, y \in M2\} \quad [5]$$

In the event that M1 and M2 are 4-PAM modulations, M3 would be a 16-QAM modulation. An example of a non-prismatic modulation scheme (32-QAM) with a non-Gray code is described later with respect to FIG. 9.

Figure 4:
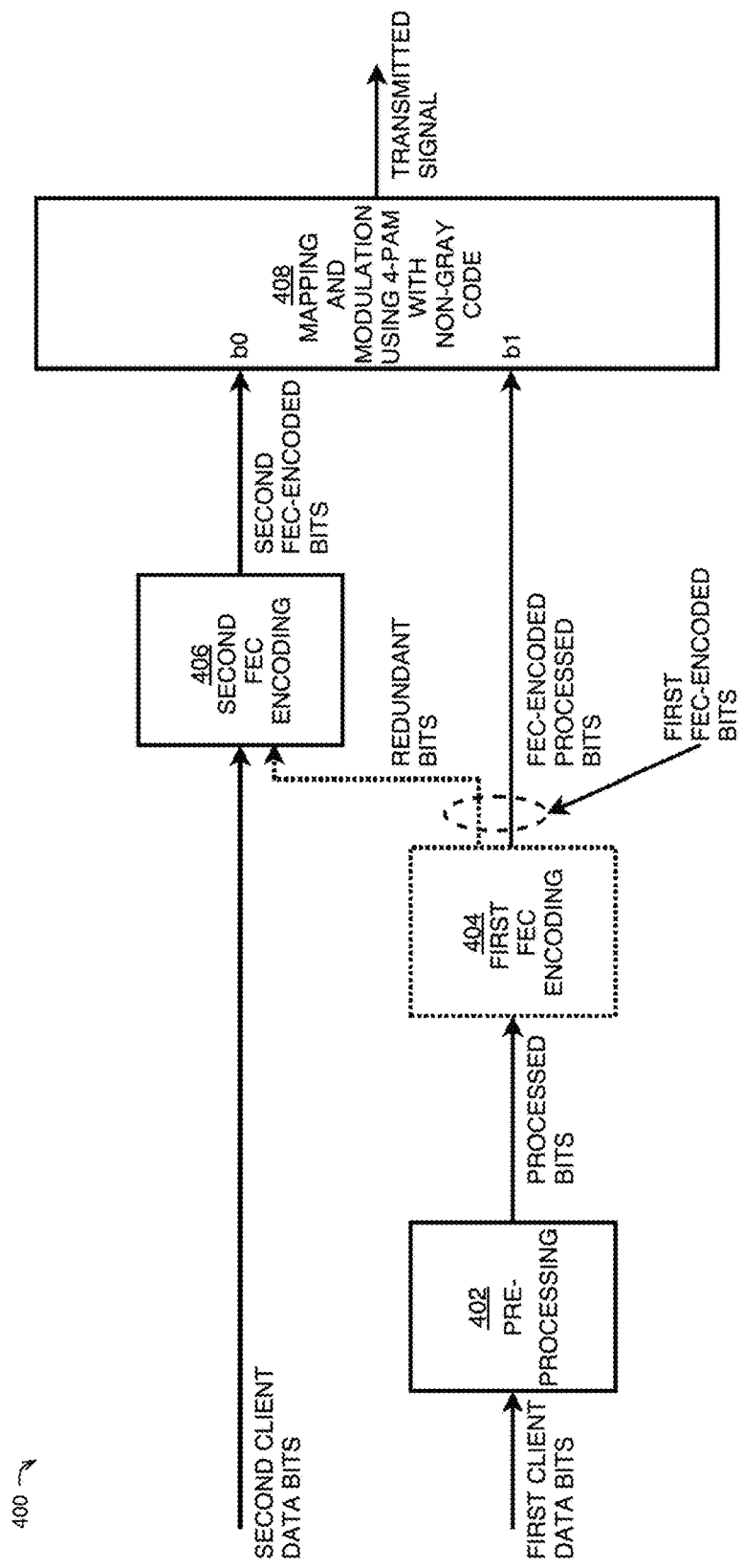
FIG. 4 illustrates an example process for encoding client data bits for transmission over a communications channel using the 4-PAM modulation scheme with the non-Gray code represented by the constellation diagram illustrated in FIG. 2.

FIG. 4 illustrates an example process 400 for encoding client data bits for transmission over a communications channel using the 4-PAM modulation scheme with the non-Gray code represented by the constellation diagram illustrated in FIG. 2. The process 400 may be performed at a transmitter electronic device, such as the transmitter 102.

The client data bits to be encoded may be partitioned into two sets: first client data bits and second client data bits. Pre-processing 402 may be applied to the first client data bits in order to generate processed bits. Similarly to the pre-processing 108 described with respect to FIG. 1, the pre-processing 402 may comprise an encoding scheme that takes input client data bits having a substantially equal probability of being zero and being one, that is P(b=0)≈P(b=1), and generates processed bits having a substantially higher probability of being zero than being one, that is P(b=0)>>P(b=1). For example, the pre-processing 402 may comprise encoding using a tree code, as described by Oveis Gharan et al. in U.S. Pat. No. 9,698,939.

The processed bits generated by the pre-processing 402 may optionally undergo first FEC encoding 404, thereby generating first FEC-encoded bits consisting of FEC-encoded processed bits and redundant bits. As a result of the pre-processing 402, the processed bits may have a low susceptibility to noise. Accordingly, the first FEC-encoded bits outputted by the first FEC encoding 404 may include little (or even no) redundancy. In other words, the first FEC encoding 404 may have an information rate R that is close to or equal to 1, that is R≈1.0. In one example, the first FEC encoding 404 may have an information rate R that is greater than 0.95 and less than 0.99. The first FEC encoding 404 may be implemented, for example, using a large-vector Bose-Chaudhuri-Hocquenghem (BCH) code, a large product code, a staircase code, or a compression code.

The first FEC encoding 404 may be systematic, such that the FEC-encoded processed bits are identical to the processed bits. More generally, the first FEC encoding 404 may provide a one-to-one mapping between each small set of processed bits and a corresponding FEC-encoded processed symbol. For example, a FEC-encoded processed bit could be a simple inversion of the original processed bit that is inputted to the first FEC-encoding 404, such that a processed bit having a value "1" is mapped to a FEC-encoded processed bit having a value "0", while a processed bit having a value "0" is mapped to a FEC-encoded processed bit having a value "1." FEC encoding that provides this property of a one-to-one mapping may be referred to as "substantially systematic" FEC encoding, in that this encoding preserves the desired properties from the processing. In contrast to that, the creation of redundant bits from processed bits generally destroys the desired properties imparted by the processing.

In the case that the first FEC encoding 404 is systematic, the FEC-encoded processed bits that are generated by the first FEC encoding 404 are identical to the processed bits that undergo the first FEC encoding, and therefore have the same probability of P(b=0)>>P(b=1). However, due to the nature of FEC encoding, each redundant bit generated by the first FEC encoding 404 may have a substantially equal probability of being zero and being one, that is P(b=0)≈P(b=1).

A second FEC encoding scheme 406 may be applied to the second client data bits, and optionally to the redundant bits generated by the first FEC encoding 404. In contrast to the first FEC encoding 404, the second FEC encoding 406 may be relatively strong, with an information rate R<<1.0, thereby generating second FEC-encoded bits that contain more redundancy than the first FEC-encoded bits. In one example, the second FEC encoding 406 may have an information rate R that is greater than 0.5 and less than 0.7. For example, the second FEC encoding 406 may have an information rate R 0.6. The second FEC encoding 406 may employ a systematic code or may employ a code that is not systematic. Similarly to the first client data bits, the second client data bits may have a substantially equal probability of being zero and being one. Since both the second client data bits and the redundant bits have P(b=0)≈P(b=1), the second FEC-encoded bits generated by the second FEC encoding 406 also have P(b=0)≈P(b=1).

The FEC-encoded processed bits generated by the first FEC encoding 404, and the second FEC-encoded bits generated by the FEC encoding 406 may undergo mapping and modulation 408 using a 4-PAM modulation scheme with the non-Gray code represented by the constellation diagram is illustrated in FIG. 2. Specifically, two-bit symbols may be created by mapping the second FEC-encoded bits to the bit position b0, and mapping the FEC-encoded processed bits to bit position b1. These two-bit symbols may be modulated onto the communications channel using the non-Gray code illustrated in FIG. 2, and a signal representing the symbols may be transmitted to a receiver.

As was described previously, the non-Gray code illustrated in FIG. 2 dictates that bits assigned to the b1 position have a lower susceptibility to noise than bits assigned to the b0 position, as a result of the respective Euclidean distances between the corresponding symbols. Furthermore, the symbols with a value of one at the b1 position have a higher energy than the symbols with a value of zero at the b1 position. For this reason, it may be advantageous to map the FEC-encoded processed bits (which, for systematic first FEC encoding 404, have P(b=0)>>P(b=1)) to the b1 position. By assigning the FEC-encoded processed bits (which are more likely to be zero than one) to the b1 bit position in the 4-PAM symbols, the result will be an increase in the number of symbols with the energy $E_{b1=0}$=0.5, and a decrease in the number of symbols with the energy $E_{b1=1}$=4.5, which may provide an increased tolerance to noise.

Since the second FEC-encoded bits have substantially equal probabilities of being zero and being one, these bits may be assigned to the b0 position, as there is no difference between the average energy of the symbols for which b0=0 and the average energy of the symbols for which b0=1.

In some examples, the first FEC encoding 404 may be omitted, such that the processed bits generated by the pre-processing 402 are directly mapped to the b1 bit position, and such that the second FEC encoding 406 is only applied to the second client data bits (because in this case there are no redundant bits).

In some examples, the number of client data bits that are classified as first client data bits (and thus undergo pre-processing 402) may vary in accordance with user preferences or requirements of a given application, whereas the number of client data bits that are classified as second client data bits (and thus undergo the stronger FEC encoding 406) may be relatively constant across applications.

Figure 5:
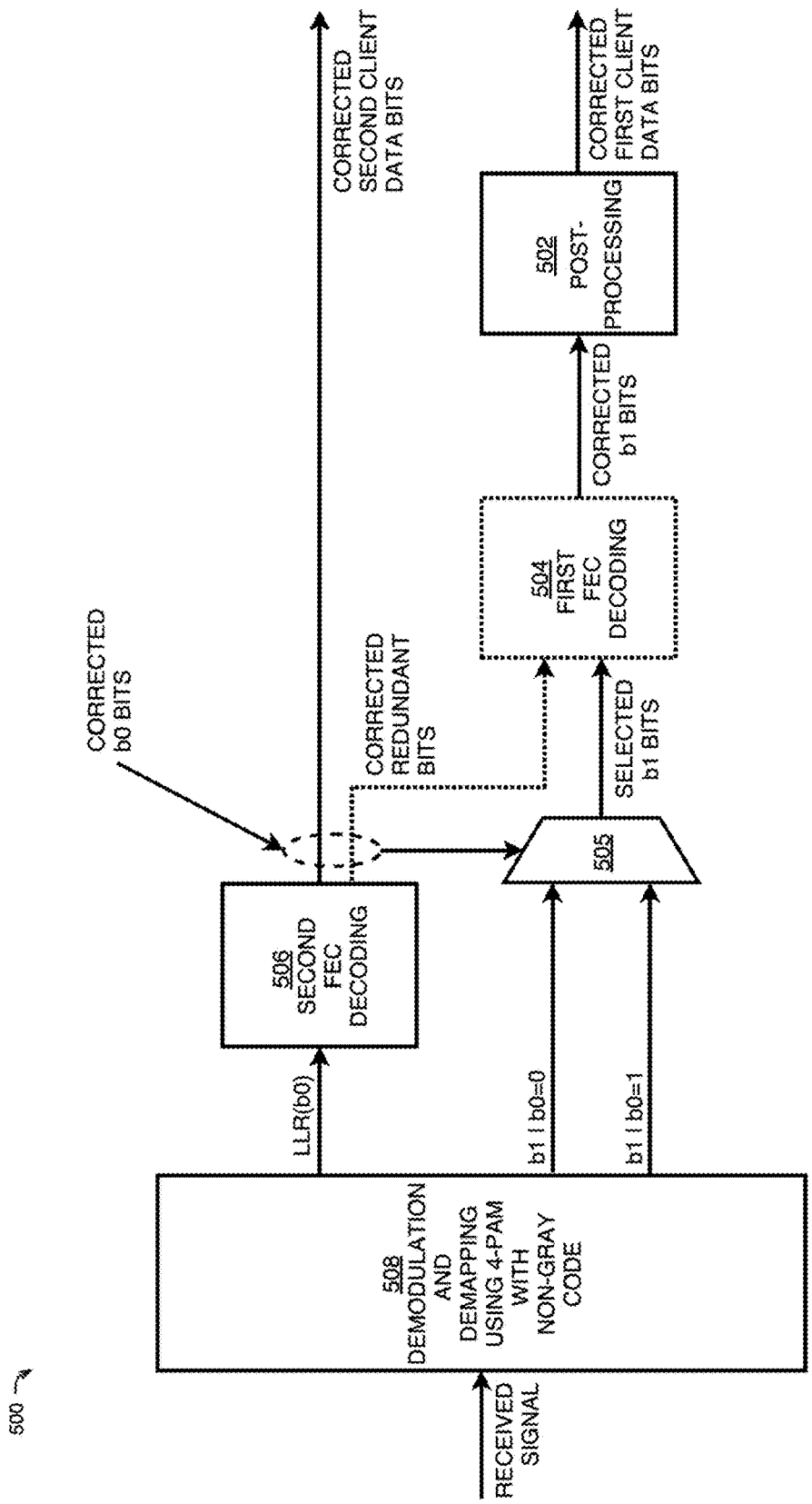
FIG. 5 illustrates an example process for decoding client data bits from a signal received over a communications channel using conditional chain decoding based on the 4-PAM modulation scheme with the non-Gray code represented by the constellation diagram illustrated in FIG. 2.

FIG. 5 illustrates an example process 500 for decoding client data bits from a signal received over a communications channel using conditional chain decoding based on the 4-PAM modulation scheme with the non-Gray code represented by the constellation diagram illustrated in FIG. 2. The process 500 may be performed at a receiver electronic device, such as the receiver 122.

A signal may be received over a communications channel from a transmitter, the signal having been generated by a transmitting electronic device configured to perform the process 400 for encoding client data bits. Estimates of transmitted symbols may be determined from the received signal using demodulation and demapping 508, which is based on the mapping and modulation 408 using 4-PAM modulation with non-Gray coding. From the estimates of the transmitted symbols, bit estimates may be determined for the first bit position b0. In one example, these estimates are determined in the form of log likelihood ratios LLR(b0). In another example, these estimates are determined in the form of some other confidence value or a binary value.

As described previously with respect to FIG. 4, the bits assigned to the b0 bit position were the second FEC-encoded bits that were generated by applying the FEC encoding 406 to the second client data bits and, if present, to the redundant bits generated by the first FEC encoding 404. Thus, second FEC decoding 506, which corresponds to the second FEC encoding 406, may be applied to the bit estimates for position b0 in order to generate corrected (effectively error-free) b0 values. These corrected b0 values consist of corrected redundant bits and corrected second client data bits, all of which should have a substantially equal probability of being zero and being one. Assuming that the second FEC decoding 506 corrects all errors in the bit estimates for position b0, the corrected second client data bits and corrected redundant bits will be identical to the second client data bits and redundant bits in FIG. 4.

As described with respect to FIG. 2, conditional chain decoding may require less memory and hardware complexity than traditional chain decoding. Conditional chain decoding is employed in the process 500 by using the demodulation and demapping 508 to determine two conditional estimates for the second bit position b1, corresponding to the two possible values of the b0 bit. These two conditional estimates, denoted b1|b0=0 and b1|b0=1, may be temporarily stored in memory. Once the corrected b0 value has been determined from the FEC decoding 506, this corrected b0 value may be used to adjudicate which of the stored conditional estimates, b1|b0=0 or b1|b0=1, is the appropriate estimate to select. This adjudication and selection of a b1 estimate based on the corrected b0 value is denoted at 505 in FIG. 5. Once the appropriate b1 estimate is selected, the other estimate may be erased from memory.

As described previously with respect to FIG. 4, the bits assigned to the b1 bit position were FEC-encoded processed bits generated by the first FEC encoding 404. If the first FEC encoding 404 was systematic, it follows that the bits assigned to the b1 bit position would be identical to the processed bits generated by the pre-processing 402. Thus, hard-decision first FEC decoding 504, which corresponds to the first FEC encoding 404, may be applied to a combination of the selected b1 estimates and the corrected redundant bits obtained from the second FEC decoding 506, in order to generate corrected (effectively error-free) b1 values. Similarly to the processed bits generated by the pre-processing 402, the corrected b1 values will have a significantly higher probability of being zero than being one. Post-processing 502 may be applied to the corrected b1 values in order to recover corrected first client data bits. The post-processing 502 is the reverse of the pre-processing 402, such that it takes bits having $P(b=0) \gg P(b=1)$, and outputs bits having $P(b=0) \approx P(b=1)$. For example, the post-processing 502 may comprise decoding based on a tree code that was used for the pre-processing 402. Assuming that the first FEC decoding 504 corrects all errors in the b1 estimates, the corrected b1 values will be identical to the processed bits generated by the pre-processing 402, and the corrected first client data bits will be identical to the first client data bits in FIG. 4.

In the event that the first FEC encoding 404 was omitted during the encoding process 400, the first FEC decoding 504 would similarly be omitted during the decoding process 500. In this case, the corrected b0 values would consist solely of the corrected second client data bits, and the post-processing 502 would be applied directly to the selected b1 estimates.

In the preceding example, the FEC scheme denoted by the first FEC encoding 404 and the first FEC decoding 504 may be applied to all, substantially all, or a majority of the processed bits, while the FEC scheme denoted by the second FEC encoding 406 and the second FEC decoding 506 may be applied to all, substantially all, or a majority of the (unprocessed) second client data bits.

The example processes described with respect to FIGS. 4 and 5 may be generalized for modulation schemes other than 4-PAM with the non-Gray code represented by the constellation diagram illustrated in FIG. 2. For example, similar methods may be applied for the 16-QAM modulation scheme with the non-Gray code represented by the constellation diagram illustrated in FIG. 3, or other modulation schemes with other codes (not shown).

Figure 6:
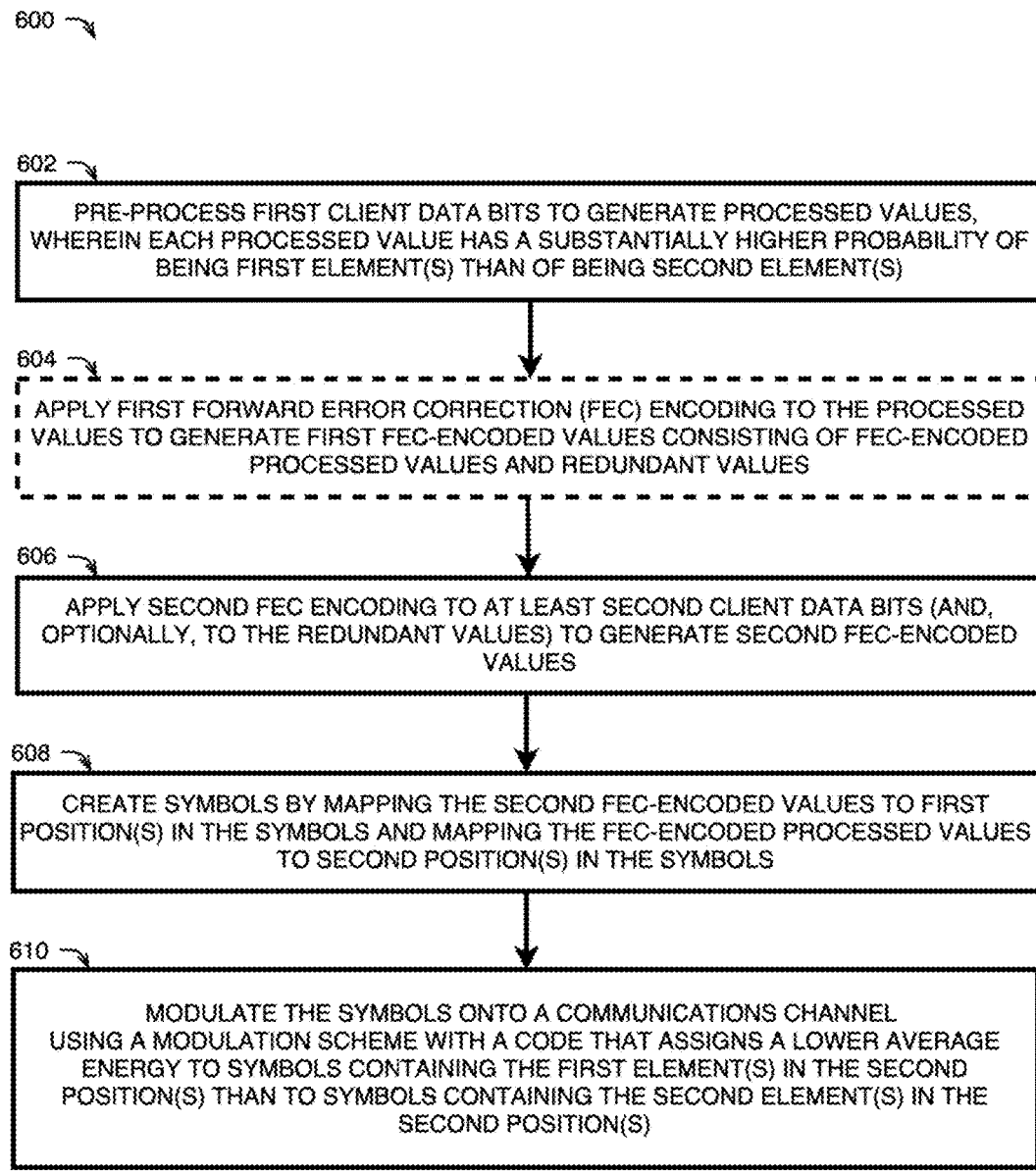
FIG. 6 illustrates a method for encoding client data bits for transmission over a communications channel, in accordance with examples of the technology disclosed herein.

FIG. 6 illustrates a method 600 for encoding client data bits for transmission over a communications channel, in accordance with examples of the technology disclosed herein. The method 600 may be performed at a transmitter electronic device, such as the transmitter 102. The method 600 may be used with a variety of modulation schemes and codes.

The client data bits to be encoded may comprise first client data bits and second client data bits. Each client data bit may have a substantially equal probability of being zero and being one, that is $P(b=0) \approx P(b=1)$.

At 602, pre-processing may be applied to the first client data bits to generate processed values, where each processed value is equal to an element of a set of possible processed values. In examples where the processed values are binary, the elements of the set are the two bit values zero and one. In other examples, the set may consist of an alphabet or other indicators, such that each processed value is selected from more than two elements. The nature of the pre-processing is such that each processed value is made to have substantially unequal probabilities of being one or more first elements of a set of possible processed values and of being one or more second elements of the set of possible processed values. For example, as described with respect to FIG. 4, each processed bit has a substantially higher probability of being zero than being one, that is $P(b=0) \gg P(b=1)$. In another example (not shown), each processed bit could have a substantially lower probability of being zero than being one, that is $P(b=0) \ll P(b=1)$. In general, each processed value may have a substantially higher probability of being one or more first elements than of being one or more second elements. In one example, the pre-processing may be implemented by encoding using a tree code, as described by Oveis Gharan et al. in U.S. Pat. No. 9,698,939.

At 604, first FEC encoding may optionally be applied to the processed values to generate first FEC-encoded values consisting of FEC-encoded processed values and redundant values, where each redundant value has a substantially uniform probability. That is, each redundant value has a substantially equal probability of being any element of a set of possible redundant values. The first FEC encoding may be systematic, such that FEC-encoded processed values are identical to the original processed values, or the first FEC-encoding may be substantially systematic, such that it provides a one-to-one mapping between each processed value and a corresponding FEC-encoded processed value.

At 606, a second FEC encoding scheme may be applied to at least the second client data bits in order to generate second FEC-encoded values, where each second FEC-encoded value has a substantially uniform probability. That is, each second FEC-encoded value has a substantially equal probability of being any element of a set of possible second FEC-encoded values. Optionally, the second FEC encoding scheme may be applied to a combination of the second client data bits and the redundant values generated at 604, in order to generate the second FEC-encoded values.

At 608, symbols may be created by mapping the second FEC-encoded values to one or more first positions in the symbols, and mapping the FEC-encoded processed values to one or more second positions in the symbols. For the two-bit symbols illustrated in FIG. 2, the second FEC-encoded bits would be mapped to the bit position b0, and the FEC-encoded processed bits would be mapped to the bit position b1. For the four-bit symbols illustrated in FIG. 3, the second FEC-encoded bits would be mapped to the bit positions b0 and b1, and the FEC-encoded processed bits would be mapped to the bit positions b2 and b3. In another example, described in more detail below with respect to FIG. 8, for six-bit symbols, the second FEC-encoded bits could be mapped to two of the bit positions, and the FEC-encoded processed bits could be mapped to the remaining four bit positions. In yet another example, described in more detail below with respect to FIG. 9, for five-bit symbols, the second FEC-encoded bits could be mapped to two of the bit positions, and the FEC-encoded processed bits could be mapped to the remaining three bit positions.

At 610, the symbols created at 608 may be modulated onto a communications channel using a modulation scheme with a code that assigns a lower average energy to symbols containing the one or more first elements in the one or more second positions than to symbols containing the one or more second elements in the one or more second positions. As described with respect to FIG. 4, where the 4-PAM modulation scheme with the non-Gray code is used, the constellation diagram for which is illustrated in FIG. 2, the second FEC-encoded bits would be mapped to the bit position b0 (i.e., "first position"), and the FEC-encoded processed bits would be mapped to the bit position b1 (i.e., "second position"). The non-Gray code assigns a lower average energy to the 4-PAM symbols containing the bit "0" in the second position (which is the higher-probability element in this example) than to the 4-PAM symbols containing the bit "1" in the second position (which is the lower-probability element in this example). The result of this code is that more of the symbols will be transmitted at a lower energy, thereby making the transmitted client data bits less susceptible to noise during the transmission.

In another example, when using the 16-QAM modulation scheme with the non-Gray code represented by the constellation diagram illustrated in FIG. 3, the second FEC-encoded bits would be mapped to bit positions b0 and b1 (i.e., "first positions"), and the FEC-encoded processed bits would be mapped to bit positions b2 and b3 (i.e., "second positions"). The non-Gray code assigns a lower average energy to the 16-QAM symbols containing the bit "0" in the second positions (which is the higher-probability element in this example) than to the 16-QAM symbols containing the bit "1" in the second positions (which is the lower probability value in this example). Again, the result of this code is that more of the symbols will be transmitted at a lower energy, thereby making the transmitted client data bits less susceptible to noise. Also, encoding the client data bits according to the method 600 may allow for chain decoding at the receiver, such that the decoding of one group of values may be used to improve the decoding of another group of values.

Figure 8:
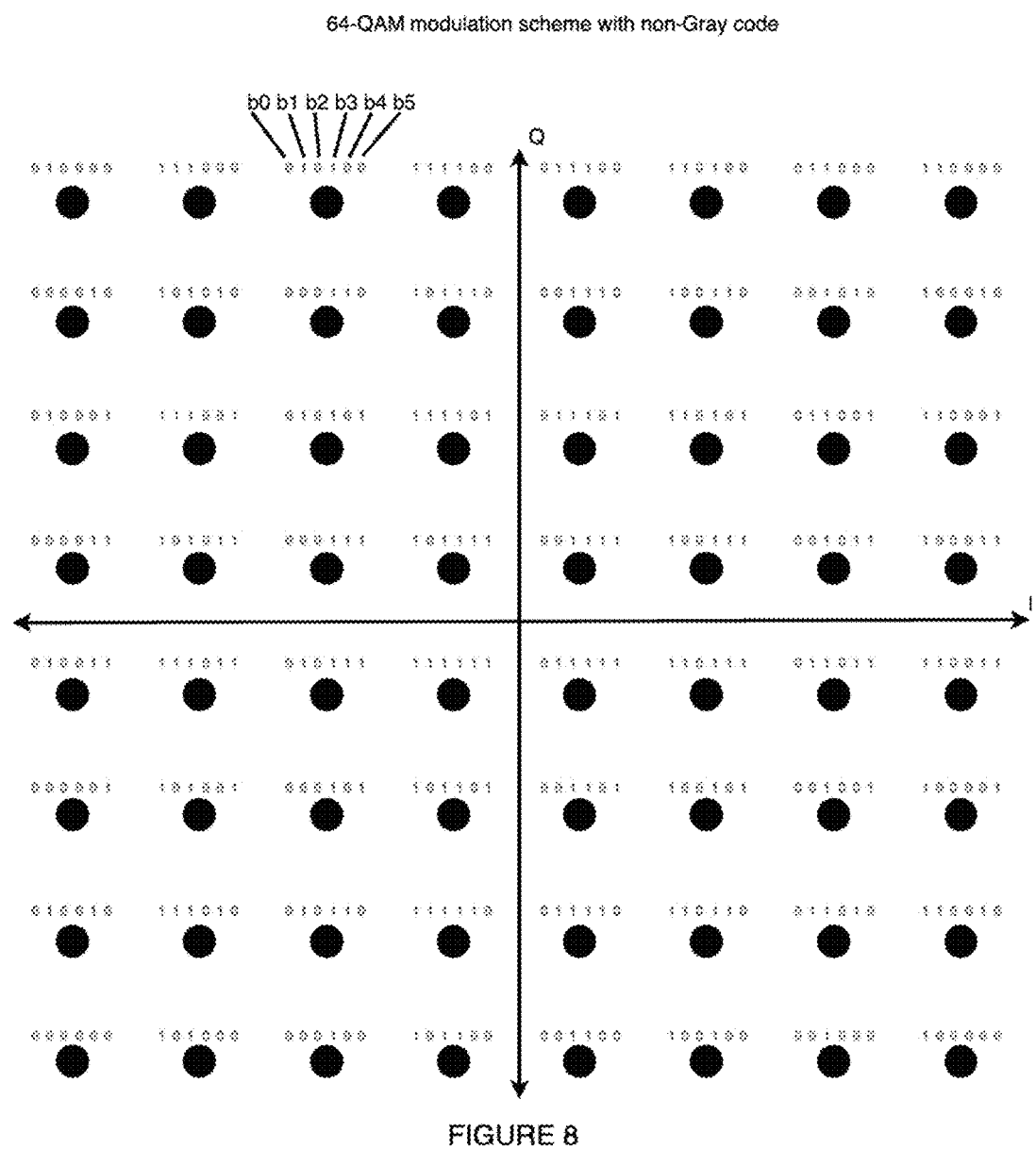
FIG. 8 illustrates a constellation diagram for a 64-level quadrature amplitude modulation (64-QAM) modulation scheme with a non-Gray code.

In another example, in the case of the 64-QAM modulation scheme with non-Gray code represented by the constellation diagram illustrated in FIG. 8, the second FEC-encoded bits could be mapped to the b0 and b1 bit positions (i.e., "first positions"), while the FEC-encoded processed bits could be mapped to the b2, b3, b4, and b5 bit positions (i.e., "second positions"). In contrast to the 4-PAM and 16-QAM examples, the code illustrated in FIG. 8 assigns a higher average energy to the 64-QAM symbols containing the bit "0" in the second positions than to the 64-QAM symbols containing the bit "1" in the second positions. Accordingly, the second positions in this case would be suitable for mapping FEC-encoded processed bits that are made to have a lower probability of being zero than being one, that is $P(b=0) \ll P(b=1)$.

Figure 9:
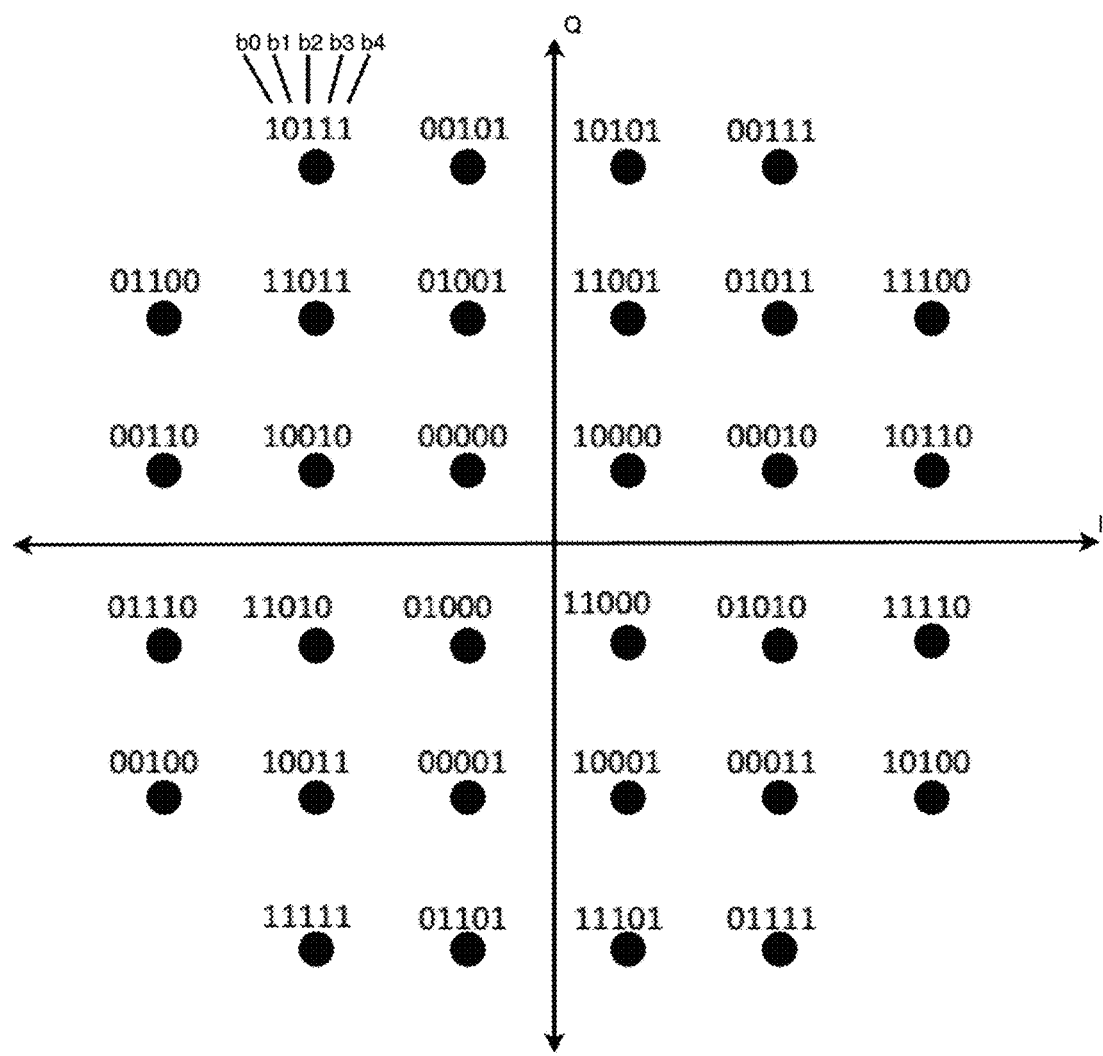
FIG. 9 illustrates a constellation diagram for a 32-level quadrature amplitude modulation (32-QAM) modulation scheme with a non-Gray code.

In another example, in the case of the 32-QAM modulation scheme with non-Gray code represented by the constellation diagram illustrated in FIG. 9, the second FEC-encoded bits could be mapped to the b0 and b1 bit positions (i.e., "first positions"), while the FEC-encoded processed bits could be mapped to the b2, b3, and b4 bit positions (i.e., "second positions"). The code illustrated in FIG. 9 assigns a higher average energy to the 32-QAM symbols containing the bit "1" in the second positions than to the 32-QAM symbols containing the bit "0" in the second positions. Accordingly, the second positions in this case would be suitable for mapping FEC-encoded processed bits that are made to have a lower probability of being one than being zero, that is $P(b=1) \ll P(b=0)$.

Figure 7:
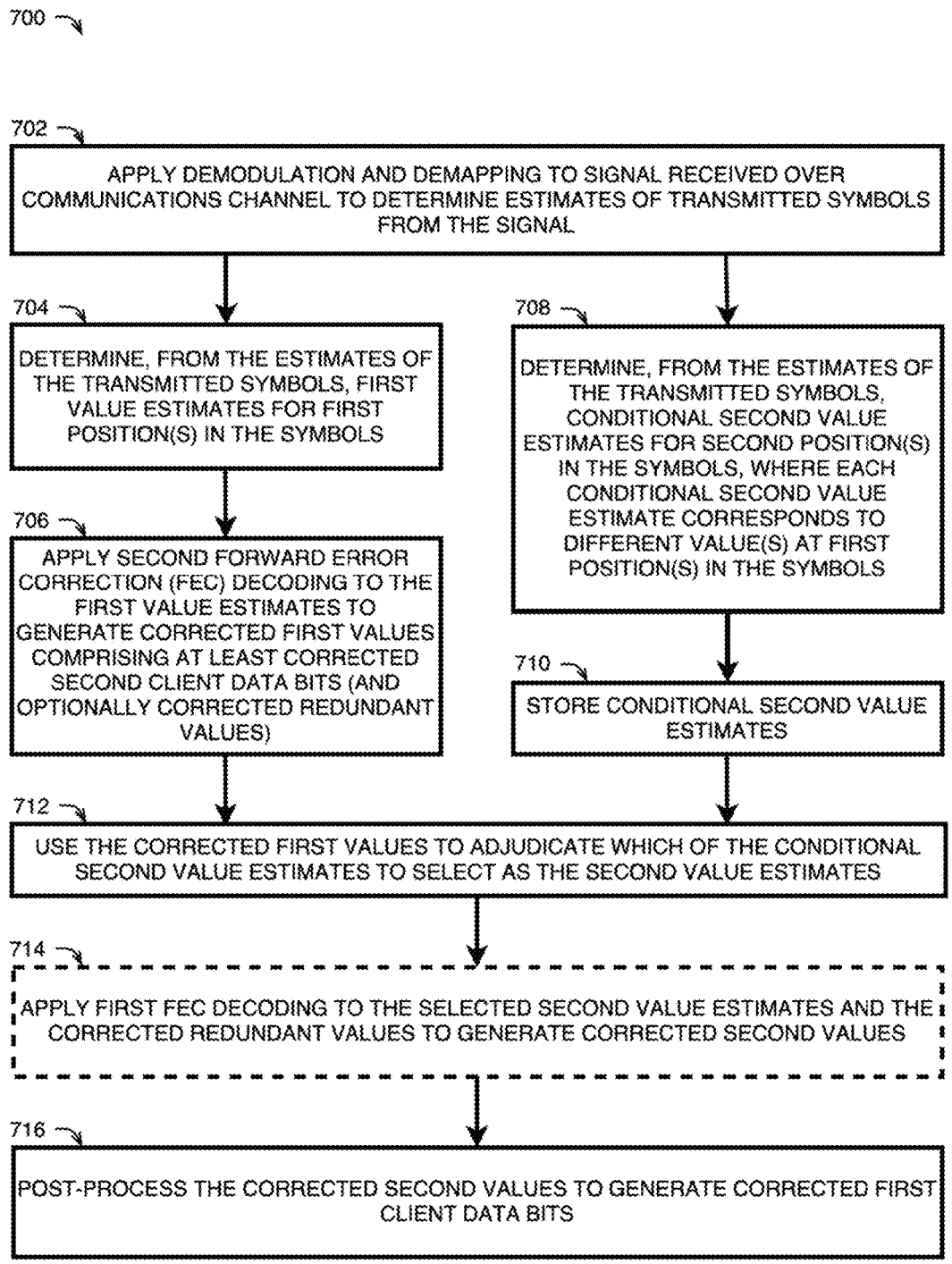
FIG. 7 illustrates a method for decoding client data bits from a signal received over a communications channel, in accordance with examples of the technology disclosed herein.

FIG. 7 illustrates a method 700 for decoding client data bits from a signal received over a communications channel, in accordance with examples of the technology disclosed herein. The method 700 may be performed at a receiver electronic device, such as the receiver 122.

At 702, demodulation and demapping may be applied to a signal received over a communications channel in order to determine estimates of transmitted symbols from the signal. Where the signal is from a transmitter electronic device implementing the method 600, the demodulation and demapping applied at 702 are based on the modulation scheme and the code used at 610.

At 704, the estimates of the transmitted symbols may be used to determine first value estimates for one or more first positions in the symbols. In one example, the first value estimates may be in the form of log likelihood ratios. In another example, the first value estimates may be in the form of other confidence values or binary values. Where the transmitted symbols were modulated using the 4-PAM modulation scheme with the non-Gray code represented by the constellation diagram illustrated in FIG. 2, the first value estimates determined at 704 would be bit estimates for the bit position b0. Where the transmitted symbols were modulated using the 16-QAM modulation scheme with the non-Gray code represented by the constellation diagram illustrated in FIG. 3, the first value estimates determined at 704 would be bit estimates for the bit positions b0 and b1.

At 706, second FEC decoding may be applied to the first value estimates to generate corrected first values, the second FEC decoding corresponding to the second FEC encoding applied at 606. In the case of the 4-PAM modulation scheme, the corrected first values would comprise corrected b0 values. In the case of the 16-QAM modulation scheme, the corrected first values would comprise corrected b0 and b1 values. The corrected first values generated at 706 comprise at least corrected second client data bits. The corrected first values generated at 706 may optionally comprise corrected redundant values corresponding to the redundant values generated by the first FEC encoding at 604. Assuming that the second FEC decoding performed at 706 corrects all errors in the first value estimates, the corrected first values will be identical to the second client data bits and the redundant values encoded at 606.

At any point before, during, or after the steps performed at 704 and 706, the transmitted symbol estimates determined at 702 may be used to determine two or more conditional second value estimates for one or more second positions in the symbols, as denoted at 708. Each conditional second value estimate determined at 708 may correspond to a different first value (or combination of first values) at the one or more first positions. As previously described, in the case of the 4-PAM modulation scheme, two conditional estimates for the bit position b1 would be determined corresponding to the two possible values at the bit position b0. These two conditional estimates may be denoted b1|b0=0 and b1|b0=1. In the case of the 16-QAM modulation scheme, there would be four conditional estimates determined at 708, where each conditional estimate represents estimates for the values at the bit positions b2 and b3 corresponding to a particular combination of values at the bit positions b0 and b1. These four conditional estimates may be denoted as b2,b3|b0=0, b1=0; b2,b3|b0=0,b1=1; b2,b3|b0=1,b1=0; and b2,b3|b0=1, b1=1. Similarly to the case of 16-QAM, in the case of 32-QAM, four conditional estimates may be determined for the bit positions b2, b3, and b4. These four conditional estimates may be denoted as b2,b3,b4|b0=0,b1=0; b2,b3, b4|b0=0,b1=1; b2,b3,b4|b0=1,b1=0; and b2,b3,b4|b0=1, b1=1.

At 710, the conditional second value estimates may be temporarily stored in memory. It is contemplated that one conditional second value estimate may or may not be the same as another conditional second value estimate. Where there are duplications in the conditional second value estimates, a single value may be stored and associated with multiple conditions.

At 712, the corrected first values generated at 706 may be used to select second value estimates from the conditional second value estimates that were stored at 710. For example, in the case of the 16-QAM modulation scheme, the corrected values at bit positions b0 and b1 generated at 706 may be used to select the corresponding b2 and b3 estimates from the stored conditional bit estimates. The non-selected b2, b3 estimates may be erased from memory.

As an alternative to storing the conditional second value estimates, other values that could be used to calculate the conditional second value estimates could be stored. For example, squared Euclidean distances could be stored at 710, and the appropriate squared Euclidean distances could be selected at 712 and then used to calculate the appropriate second value estimates.

Where the encoding method 600 includes the step of first FEC encoding at 604, the decoding method 700 may include a corresponding step of first FEC decoding, as shown at 714. That is, first FEC decoding may be applied to the second value estimates selected at 712 and to the corrected redundant values (which are part of the corrected first values generated at 706) in order to generate corrected second values.

At 716, post-processing may be applied to the corrected second values in order to recover corrected first client data bits. The post-processing applied at 716 is the reverse of the pre-processing applied at 602. For example, in the case of the 4-PAM modulation scheme, the post-processing would take the corrected bits b1, which have $P(b=0) \gg P(b=1)$, and would output corrected first client data bits having $P(b=0) \approx P(b=1)$. In the case of the 16-QAM modulation scheme, the post-processing would take the corrected bits b2 and b3, which each have $P(b=0) \gg P(b=1)$, and would output corrected first client data bits having $P(b=0) \approx P(b=1)$. In general, the post-processing may be applied to corrected second values, each having a substantially higher probability of being one or more first elements than of being one or more second elements, and may generate corrected first client data bits, each having a substantially equal probability of being zero and being one.

Assuming that the first FEC decoding performed at 714 corrects all errors in the second value estimates, the corrected second values will be identical to the processed values generated by the pre-processing at 602, and the corrected first client data bits will be identical to the first client data bits that were encoded using the method 600.

Where the decoding method 700 does not include the step of first FEC decoding at 714, the values selected at 712 may directly undergo the post-processing at 716.

Although not explicitly illustrated, examples are contemplated in which the technology described herein may be incorporated with contrast coding techniques described by Oveis Gharan et al. in U.S. patent application Ser. No. 15/672,434, filed on Aug. 9, 2017. In one example, the contrast created by a contrast code could be used as an alternative to the contrast created by a non-Gray code. In another example, a contrast code could be used to enhance or to adjust the contrast created by a non-Gray code.

The preceding examples refer to logical ones and logical zeros, where the logical zeros are used to refer to states having the lowest energy or lowest voltage or other lowest magnitude. The logical ones and zeros may be physically represented, in simple form, by physical ones and zeros, respectively, in electrical logic circuits, or alternatively, by physical zeros and ones, respectively. The logical ones and zeros may alternatively be represented by other physical coding methods. For example, combinations of two logical bits "00", "01", "10", "11" could be represented by physical voltage patterns 01, 11, 00, 10, respectively. In an 8-PAM modulation scheme with such a representation, the 01 voltage pattern could map to the lowest energy level, and the 10 voltage pattern could map to the highest energy level. Such a scheme would generally be arranged such that the 10 voltage pattern would have the highest average probability and the 01 voltage pattern would have the lowest average probability, in order to create the desired logical outcome. In another example, two or more physical bits could be used to represent one logical bit, or other combinations of logical bits that are mapped into one modulated symbol.

The processed bits might be distinguished by factors such as their physical location, physical form, location in time, by association or indexing with other logical bits, or their functional relationship to bits from which they are generated. In a simple example, the processed bits are the physical bits generated by a dedicated hardware circuit that implements processing logic upon client data bits.

It is noted that substantially unequal probabilities of being one value versus another may arise when combinations of logical bits are mapped to one modulated symbol, where the probability of one combination is not equal to the probability of other combinations.

The scope of the claims should not be limited by the details set forth in the examples, but should be given the broadest interpretation consistent with the description as a whole.

What is claimed is:

1. A method performed at a transmitter for communicating client data bits over a communications channel to a receiver, the client data bits comprising first client data bits and second client data bits, each first client data bit and each second client data bit having a substantially equal probability of being zero and being one, the method comprising:
processing the first client data bits to generate processed values, wherein each processed value has a substantially higher probability of being one or more first elements than of being one or more second elements;
applying first forward error correction 'FEC' encoding to the processed values to generate first FEC-encoded values consisting of FEC-encoded processed values and redundant values;
applying second FEC encoding to at least the second client data bits to generate second FEC-encoded values;
creating symbols by mapping the second FEC-encoded values to one or more first positions in the symbols and by mapping the FEC-encoded processed values to one or more second positions in the symbols; and
modulating the symbols onto the communications channel using a modulation scheme with a code that assigns a lower average energy to symbols containing the one or more first elements in the one or more second positions than to symbols containing the one or more second elements in the one or more second positions.

2. The method as claimed in claim 1, wherein the second FEC encoding is applied to the second client data bits and to the redundant values to generate the second FEC-encoded values.

3. The method as claimed in claim 1, wherein an information rate of the first FEC encoding is higher than an information rate of the second FEC encoding.

4. The method as claimed in claim 1, wherein the first FEC encoding comprises systematic FEC encoding.

5. The method as claimed in claim 1, wherein the code comprises one or more of a non-Gray code and a contrast code.

6. The method as claimed in claim 5, wherein the non-Gray code comprises a natural code.

7. The method as claimed in claim 1, wherein the modulation scheme comprises one of a pulse-amplitude modulation 'FAM' modulation scheme and a quadrature-amplitude modulation 'QAM' modulation scheme.

8. The method as claimed in claim 1, wherein the processing is performed using a tree code.

9. The method as claimed in claim 1, wherein the processed values, the first-FEC-encoded values, and the second FEC-encoded values are bits.

10. A method performed at a receiver for decoding client data bits from a signal received over a communications channel from a transmitter, the client data bits comprising first client data bits and second client data bits, each first client data bit and each second client data bit having a substantially equal probability of being zero and being one, the method comprising:
determining estimates of transmitted symbols from the signal received over the communications channel based on a modulation scheme implemented at the transmitter;
determining, from the estimates of the transmitted symbols, first value estimates for one or more first positions in the transmitted symbols based on a code implemented at the transmitter;
determining, from the estimates of the transmitted symbols, two or more conditional second value estimates for one or more second positions in the transmitted symbols, wherein each conditional second value estimate corresponds to a different value or combination of values in the one or more first position;
applying second forward error correction 'FEC' decoding to the first value estimates to generate corrected first values, wherein the corrected first values consist of the second client data bits and redundant values;
using the corrected first values to select second value estimates from the conditional second value estimates;
applying first FEC decoding to at least the selected second value estimates to generate corrected second values, wherein each corrected second value has a substantially higher probability of being one or more first elements than of being one or more second elements; and
processing the corrected second values to generate the first client data bits.

11. The method as claimed in claim 10, wherein the first FEC decoding is applied to the second value estimates and to the redundant values to generate the second corrected values.

12. The method as claimed in claim 10, wherein the code assigns a lower average energy to symbols containing the one or more first elements in the one or more second positions than to symbols containing the one or more second elements in the one or more second positions.

13. The method as claimed in claim 10, wherein the code comprises one or more of a non-Gray code and a contrast code.

14. The method as claimed in claim 10, wherein the modulation scheme comprises one of a pulse-amplitude modulation 'FAM' modulation scheme and a quadrature-amplitude modulation 'QAM' modulation scheme.

15. The method as claimed in claim 10, wherein the corrected first values and the corrected second values are bits.

16. A receiver electronic device configured for decoding client data bits from a signal received over a communications channel from a transmitter electronic device, the client data bits comprising first client data bits and second client data bits, each first client data bit and each second client data bit having a substantially equal probability of being zero and being one, the receiver electronic device comprising:
a processor; and
a memory storing computer-executable code which, when executed by the processor, causes the receiver electronic device
to determine estimates of transmitted symbols from the signal received over the communications channel based on a modulation scheme implemented at the transmitter;
to determine, from the estimates of the transmitted symbols, first value estimates for one or more first positions in the transmitted symbols based on a code implemented at the transmitter;

to determine, from the estimates of the transmitted symbols, two or more conditional second value estimates for one or more second positions in the transmitted symbols, wherein each conditional second value estimate corresponds to a different value or combination of values at the one or more first positions;

to apply second forward error correction 'FEC' decoding to the first value estimates to generate corrected first values, wherein the corrected first values consist of the second client data bits and redundant values;

to use the corrected first values to select second value estimates from the conditional second value estimates;

to apply first FEC decoding to the selected second value estimates to generate corrected second values, wherein each corrected second value has a substantially higher probability of being one or more first elements than of being one or more second elements; and to process the corrected second values to generate the first client data bits.

17. The receiver electronic device as claimed in claim 16, wherein the first FEC decoding is applied to the second value estimates and to the redundant values to generate the second corrected values.

18. The receiver electronic device as claimed in claim 16, wherein the code assigns a lower average energy to symbols containing the one or more first elements in the one or more second positions than to symbols containing the one or more second elements in the one or more second positions.

19. The receiver electronic device as claimed in claim 16, wherein the code comprises one or more of a non-Gray code and a contrast code.

20. The receiver electronic device as claimed in claim 16, wherein the modulation scheme comprises one of a pulse-amplitude modulation 'FAM' modulation scheme and a quadrature-amplitude modulation 'QAM' modulation scheme.

21. A transmitter electronic device configured for communicating client data bits over a communications channel to a receiver electronic device, the client data bits comprising first client data bits and second client data bits, each first client data bit and each second client data bit having a substantially equal probability of being zero and being one, the transmitter electronic device comprising:

a processor; and a memory storing computer-executable code which, when executed by the processor, causes the transmitter electronic device to process the first client data bits to generate processed values, wherein each processed value has a substantially higher probability of being one or more first elements than of being one or more second elements;

to apply first forward error correction TEC' encoding to the processed values to generate first FEC-encoded values consisting of FEC-encoded processed values and redundant values;

to apply second FEC encoding to at least the second client data bits to generate second FEC-encoded values;

to create symbols by mapping the second FEC-encoded values to one or more first positions in the symbols and by mapping the FEC-encoded processed values to one or more second positions in the symbols; and to modulate the symbols onto the communications channel using a modulation scheme with a code that assigns a lower average energy to symbols containing the one or more first elements in the one or more second positions than to symbols containing the one or more second elements in the one or more second positions.

22. The transmitter electronic device as claimed in claim 21, wherein the second FEC encoding is applied to the second client data bits and to the redundant values to generate the second FEC-encoded values.

23. The transmitter electronic device as claimed in claim 21, wherein an information rate of the first FEC encoding is higher than an information rate of the second FEC encoding.

24. The transmitter electronic device as claimed in claim 21, wherein the code comprises one or more of a non-Gray code and a contrast code.

* * * * *

UNITED STATES PATENT AND TRADEMARK OFFICE
CERTIFICATE OF CORRECTION

PATENT NO. : 10,484,131 B2
APPLICATION NO. : 15/841988
DATED : November 19, 2019
INVENTOR(S) : Shahab Oveis Gharan et al.

It is certified that error appears in the above-identified patent and that said Letters Patent is hereby corrected as shown below:

In the Claims

Column 19, Lines 55-58 Claim 7 should read:
7. The method as claimed in claim 1, wherein the modulation scheme comprises one of a pulse-amplitude modulation 'PAM' modulation scheme and a quadrature-amplitude modulation 'QAM' modulation scheme.

Column 20, Lines 44-47 Claim 14 should read:
14. The method as claimed in claim 10, wherein the modulation scheme comprises one of a pulse-amplitude modulation 'PAM' modulation scheme and a quadrature-amplitude modulation 'QAM' modulation scheme.

Column 21, Lines 38-42 Claim 20 should read:
20. The receiver electronic device as claimed in claim 16, wherein the modulation scheme comprises one of a pulse-amplitude modulation 'PAM' modulation scheme and a quadrature-amplitude modulation 'QAM' modulation scheme.

Column 22, Lines 16-19 Claim 21 should read:
to apply first forward error correction 'FEC' encoding to the processed values to generate first FEC-encoded values consisting of FEC-encoded processed values and redundant values;

Signed and Sealed this
Twenty-fourth Day of December, 2019

Andrei Iancu
*Director of the United States Patent and Trademark Office*